(12) United States Patent
Miron

(10) Patent No.: US 9,854,915 B2
(45) Date of Patent: Jan. 2, 2018

(54) FLUID DISTRIBUTION INSERT WITH AN INTEGRAL BLOWER

(71) Applicant: GENTHERM GMBH, Odelzhausen (DE)

(72) Inventor: Denis Michel Miron, Windsor (CA)

(73) Assignee: GENTHERM GMBH, Odelzhausen (DE)

( * ) Notice: Subject to any disclaimer, the term of this patent is extended or adjusted under 35 U.S.C. 154(b) by 0 days.

(21) Appl. No.: 15/321,278

(22) PCT Filed: Jul. 17, 2015

(86) PCT No.: PCT/IB2015/001748
§ 371 (c)(1),
(2) Date: Dec. 22, 2016

(87) PCT Pub. No.: WO2016/027159
PCT Pub. Date: Feb. 25, 2016

(65) Prior Publication Data
US 2017/0196362 A1    Jul. 13, 2017

Related U.S. Application Data

(60) Provisional application No. 62/025,521, filed on Jul. 17, 2014.

(51) Int. Cl.
A47C 7/72    (2006.01)
A47C 7/74    (2006.01)
B60N 2/56    (2006.01)

(52) U.S. Cl.
CPC .............. *A47C 7/744* (2013.01); *A47C 7/748* (2013.01); *B60N 2/5635* (2013.01); *B60N 2/5642* (2013.01); *B60N 2/5657* (2013.01)

(58) Field of Classification Search
CPC ...... A47C 7/744; A47B 31/02; B60N 2/5621; B60N 2/5642
USPC ..... 297/180.14, 180.12, 452.46; 165/42, 41; 108/50.13
See application file for complete search history.

(56) References Cited

U.S. PATENT DOCUMENTS

| 6,003,950 A * | 12/1999 | Larsson ................... A47C 7/74 297/180.13 |
| 6,048,024 A * | 4/2000 | Wallman .................. A47C 7/74 297/180.14 |
| 6,189,966 B1 | 2/2001 | Faust et al. |
| 6,676,207 B2 | 1/2004 | Rauh et al. |

(Continued)

FOREIGN PATENT DOCUMENTS

| CA | 2616232 A1 | 2/2007 |
| EP | 2423040 A2 | 2/2012 |

OTHER PUBLICATIONS

International Preliminary Report on Patentability for International Application No. PCT/IB2015/001748.

(Continued)

*Primary Examiner* — Jose V Chen
(74) *Attorney, Agent, or Firm* — The Dobrusin Law Firm, P.C.

(57) ABSTRACT

Disclosed is a climate control device, comprising a distribution insert and an air mover attached to the distribution insert. The air mover includes two or more diverter openings moving a fluid through the distribution insert and through a support device.

24 Claims, 3 Drawing Sheets

(56) References Cited

U.S. PATENT DOCUMENTS

| | | | |
|---|---|---|---|
| 6,786,541 B2 | 9/2004 | Haupt et al. | |
| 6,869,140 B2 | 3/2005 | White et al. | |
| 6,929,322 B2 * | 8/2005 | Aoki | B60H 1/00285 |
| | | | 297/180.13 |
| 6,976,734 B2 | 12/2005 | Stoewe | |
| 7,478,869 B2 | 1/2009 | Lazanja et al. | |
| 7,673,935 B2 * | 3/2010 | Nishide | B60N 2/5635 |
| | | | 297/180.14 |
| 7,862,113 B2 | 1/2011 | Knoll | |
| 8,777,320 B2 | 7/2014 | Stoll et al. | |
| 8,919,874 B2 * | 12/2014 | Ota | B60N 2/5642 |
| | | | 297/180.13 |
| 8,998,311 B2 * | 4/2015 | Axakov | B60N 2/5635 |
| | | | 297/180.13 |
| 9,440,567 B2 | 9/2016 | Lazanja et al. | |
| 2002/0096931 A1 | 7/2002 | White et al. | |
| 2003/0160479 A1 * | 8/2003 | Minuth | B60N 2/5635 |
| | | | 297/180.14 |
| 2004/0090093 A1 * | 5/2004 | Kamiya | B60N 2/5657 |
| | | | 297/180.14 |
| 2006/0103184 A1 | 5/2006 | Stoewe | |
| 2006/0290176 A1 * | 12/2006 | Aoki | B60N 2/5628 |
| | | | 297/180.1 |
| 2007/0029862 A1 * | 2/2007 | Bargheer | B60N 2/4876 |
| | | | 297/452.42 |
| 2007/0176471 A1 | 8/2007 | Knoll | |
| 2008/0164738 A1 * | 7/2008 | Colja | B60N 2/5621 |
| | | | 297/284.4 |
| 2009/0008970 A1 * | 1/2009 | Flory | B60N 2/5621 |
| | | | 297/180.14 |
| 2009/0015043 A1 * | 1/2009 | Macht | B60H 1/00285 |
| | | | 297/180.14 |
| 2009/0127894 A1 | 5/2009 | Bargheer et al. | |
| 2009/0295200 A1 * | 12/2009 | Ito | B60N 2/4808 |
| | | | 297/180.14 |
| 2010/0038937 A1 * | 2/2010 | Andersson | B60N 2/5635 |
| | | | 297/180.14 |
| 2011/0187165 A1 * | 8/2011 | Oota | B60N 2/5657 |
| | | | 297/180.14 |
| 2013/0164123 A1 * | 6/2013 | Helmenstein | B60N 2/5657 |
| | | | 415/183 |
| 2014/0158319 A1 * | 6/2014 | Ju | B60H 1/00021 |
| | | | 165/42 |
| 2014/0175846 A1 * | 6/2014 | Oh | B60N 3/104 |
| | | | 297/180.14 |
| 2015/0224006 A1 * | 8/2015 | Primo | A47C 7/744 |
| | | | 297/180.14 |
| 2015/0306999 A1 * | 10/2015 | Awatani | B60N 2/5635 |
| | | | 297/180.14 |
| 2015/0329027 A1 * | 11/2015 | Axakov | A47C 7/00 |
| | | | 297/180.13 |
| 2015/0329029 A1 * | 11/2015 | Akaike | B60N 2/5657 |
| | | | 297/180.14 |
| 2016/0280038 A1 * | 9/2016 | Tanaka | B60H 1/00285 |
| 2016/0288678 A1 * | 10/2016 | Berry | B60N 2/565 |
| 2016/0347217 A1 * | 12/2016 | Nishimura | B60N 2/5621 |

OTHER PUBLICATIONS

International Search Report and Written opinion for International Application No. PCT/IB2015/001748, dated Mar. 31, 2016.

* cited by examiner

FLUID DISTRIBUTION INSERT WITH AN INTEGRAL BLOWER

FIELD

The present teachings relate generally to support devices, and more particularly to a climate control device providing heating, cooling, and ventilation to a support device.

BACKGROUND

A support device can be any device that supports an occupant. For example, a support device can be a recliner, a chair, a couch, a bed, a seat, or the like. Support devices can be found virtually anywhere. For example, a support device can be found in an automobile, a train, an airplane, or in a home or office. Recently, to enhance the comfort of an occupant using a support device, various climate control devices have, been attached thereto. That is, climate control devices have been attached to the seating portion, the backrest portion, the armrests, the headrest, etc., of the support device to pass air towards the occupant; remove air from the vicinity of the occupant; or both. The air passed towards the occupant can be ambient air, warm air, cool air, or a combination thereof.

As can be imagined, attaching climate control devices to support devices can be desirable; however, some challenges exist. For example, some climate control devices are attached to, or suspended from, the seating portion or the backrest portion of the support device, which may require additional space (e.g., packaging space) that may not be readily available in some applications, such as in the cabin of an automobile, for example. Moreover, attaching a climate control device to the seating portion or the backrest portion may require additional components, such as ductwork, fasteners, etc. These additional components may undesirably add cost and weight to the support device. Attaching a climate control device to the seating portion or the backrest portion may also undesirably create noise and/or vibrations, which may be heard and/or felt by an occupant or others in the vicinity of the support device. Further, some climate control devices include an air mover (i.e., a fan or blower) with only a single opening directed towards the occupant, the support device, or both, which may limit the amount of air passed towards the occupant; limit the amount of air removed from the vicinity of the occupant; or both.

It may therefore be desirable to provide a climate control device, a support device, or both that addresses at least some of the aforementioned difficulties. For example, it may be desirable to provide a climate control device that can be produced at a relatively low cost; that can be quickly and securely attached to a support device; and can reduce packaging space once attached to a support device. It may be desirable to have a climate control, a support device, or both that produces less noise and/or vibrations during operation; and/or improves performance of the various heating, cooling, and/or ventilation functions.

Some examples of support devices and climate control devices are disclosed in U.S. Pat. Nos. 6,676,207; 6,786, 541; 6,869,140; 6,976,734; 7,478,869; and 7,862,113, all of which are incorporated by reference herein for all purposes.

SUMMARY

The present teachings are predicated upon providing an improved support device. More particularly, the teachings herein provide an improved climate control device for a support device. The climate control device may function to increase and/or improve comfort of an occupant in or near the support device. More specifically, the climate control device may move a fluid, such as air, towards, and/or away from an occupant in or near the support device. The air may be ambient air, warm air, cool air, or a combination thereof.

The climate control device according to the present teachings can be quickly and securely attached to the support device. For example, the climate control device may include a flange that that can be securely attached to the support device to prevent any air leakage therebetween, while also reducing the number of components and/or fasteners required to attach the climate control device to the support device. The climate control device may be RF welded directly to the support device.

The climate control device according to the teachings herein may include one or more openings for passing a an towards the occupant, removing an from the vicinity of the occupant, or both. Preferably, the climate control device has two or more openings, which may increase and/or balance the amount of air passed towards the occupant; increase and/or balance the amount of air removed from the vicinity of the occupant; or both.

The climate control device according to the teachings herein may be received in a cavity formed in a cushion of the support device. Doing so may reduce the amount of space (i.e., packing space) required to attach a climate control device to the support device. Doing so may also reduce or dampen undesirable noise and/or vibration created by the climate control device during operation. Further, inserting the climate control device into a cavity formed in the cushion may simplify manufacturing, reduce the number of components required to attach the climate control device to the support device, reduce the overall weight of the occupant device, or a combination thereof.

The present teachings provide a climate control device, comprising a distribution insert and an air mover attached to the distribution insert. The air mover includes two or more diverter openings moving a fluid through the distribution insert and through a support device.

The present teachings also provide a support device, comprising a seat and a climate control device. The seat has a support surface. The climate control device is connected to a portion of the seat. The climate control device includes a distribution insert and an air mover. The air mover includes two or more diverter openings moving a fluid through the distribution insert. The air mover is RF welded to the distribution insert so that a seal is formed around each of the two or more diverter openings.

The present teachings timber provide a climate control device, comprising a distribution insert attached to a support device; and an air mover having two or more openings moving a fluid through the distribution insert and the support device. The air mover includes a flange that is RF welded directly to the distribution insert forming a first seal therebetween.

DETAILED DESCRIPTION

Figure 1A:
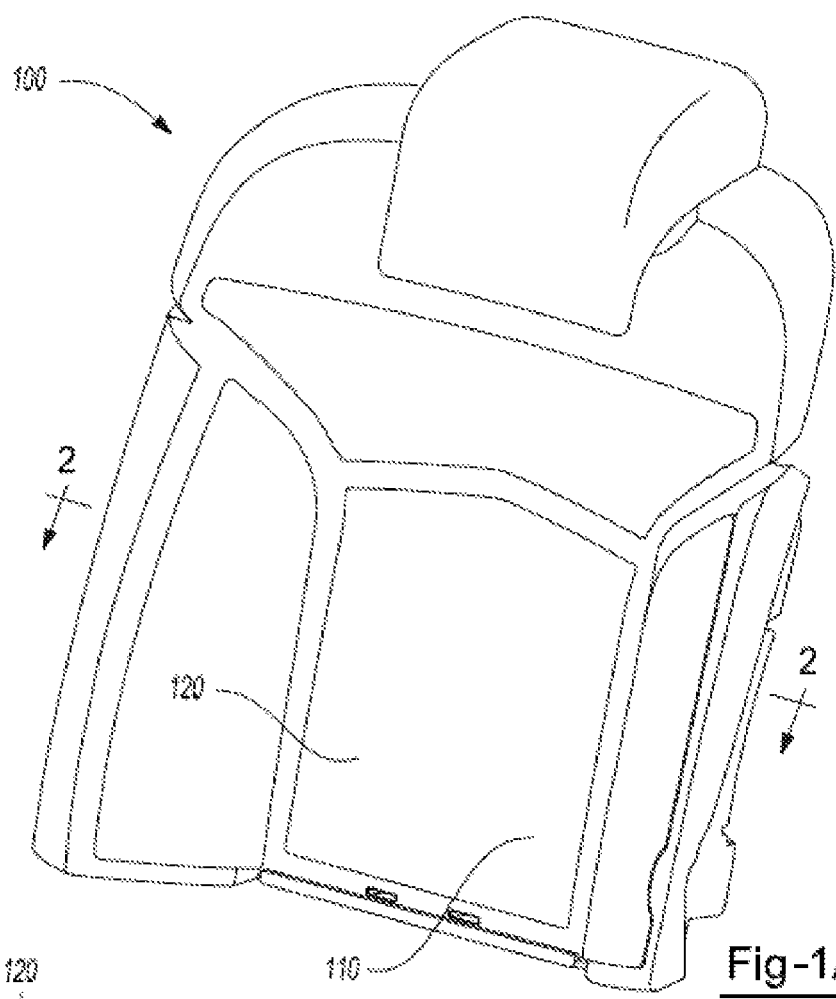
FIG. 1A is a perspective view of a support device.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings are predicated upon providing a support device. More particularly, the teachings herein provide a support device, a climate control device, a climate control device for a support device, or a combination thereof.

The support device can be any device that supports an occupant. For example, the support device can be a recliner, a chair, a couch, a bed, a seat, etc. The support device can be found virtually anywhere. For example, the support device can be located in any vehicle, such as in an automobile, a train, an airplane, etc.; at a home or in an office; or a combination thereof. The support device may include a seating portion supporting the backside and legs of an occupant; a backrest portion supporting the back of an occupant; one or more armrests supporting the arms of an occupant; a headrest supporting the head and neck of an occupant; or a combination thereof. Preferably, one or more climate control devices are attached to one or more portions of the support device, such as the seating portion, the backrest portion, the arm rest(s), the headrest, etc.

The support device may include a support surface. The support surface may be a surface that contacts and supports the occupant when the occupant is in the support device. The support surface may be an A-side. The A-side may be a top, a side, or both of the support device. The support device may also include a B-side. The B-side may face away from the occupant when the occupant is in or near the support device. The B-side may be a side that is generally opposite the A-side. The B-side may be a bottom, side, or both of the support device.

The support device may include a support structure. The support structure may support one or more components or portions of the support device. For example, the support structure may support the seating portion, the backrest portion, etc. The support structure may support an occupant in the support device. The support structure may support, connect, and/or attach the support device to a support such as the ground, the floor, a track, etc. In automotive vehicle seat embodiments, the support structure can be a seat frame that secures the support device to a vehicle body, or more specifically, a floor panel of the vehicle. The support structure may be generally rigid, generally flexible, or both.

The support structure may include one or more support structure apertures. The one or more support structure apertures may be any suitable opening, notch, cutout, aperture, void, channel, etc. in the support structure. The one or more support structure apertures may cooperate with the one or more cushion channels, the one or more cushion cavities, or both to provide one or more passageways through the support device.

The one or more passageways may function to provide for any suitable fluid to move from the A-side of the support device to the B-side of the support device, or vice versa. The fluid may be air. The edges or sides of the One or more passageways may be generally air impermeable so that the an can move through the support structure, the support device, or both without any significant leaks or pressure losses therebetween. The one or more passageways can be elongated (i.e., between the A-side and B-side) and have any suitable cross section. For example, the cross section can be generally circular, square, ovoid, oblong, irregular, triangular, etc. The cross section of the one or more passageways may be constant between the A-side and the B-side, or the size and/or shape of the cross-section may vary between the A-side and the B-side.

The support device may include one or more cushions. The one or more cushions may be one or more comfort layers disposed on the support structure. The one or more cushions may be at least partially compressible and/or at least partially form fitting. The one or more cushions may compress when an occupant or load is in contact therewith. The one or more cushions may be resilient and/or may include a memory material so that the cushion un-compresses and returns to its original state after the occupant is no longer in contact therewith. The one or more cushions may be made of any suitable material. For example, the one or more cushions may be made of foam. The one or more cushions may be generally air permeable, air impermeable, or both. The one or more cushions may include a spring core. The one or more cushions may be a unitary structure or may comprise as plurality of structures supported on the support structure.

The one or more cushions may include one or more cushion channels and, one or more cushion cavities. The one or more cushion channels, the one or more cushion cavities, or both may be any suitable opening, notch, cutout, aperture, void, channel, etc. in the cushion. The one or ore cushion channels and the one or more cushion cavities may be molded-in features in the cushion. The one or more cushion channels and one or more cushion cavities may be in fluid communication with the one or more support structure apertures to form the one or more passageways extending through the support device (i.e., between the A-side and the B-side).

The one or more cushion cavities may be configured to at least partially receive one or more of the climate control devices. Preferably, each cushion has one cushion cavity that receives one climate control device. However, each cushion may have more than one cushion cavity that may each receive one or more climate control devices. The one or more cushion cavities may receive one or more climate control devices such that the climate control device substantially fits within the cushion cavity. In other words, a climate control device may fit within the cushion cavity such that the climate control device is contained between the A-side and the B-side of the support device. By positioning the climate control device for in the cushion, assembly of the system may be simplified; less components may be required to attach the climate control device to the support device; and/or the cushion surrounding the climate control device may dampen noise and/or vibrations created by the climate control device. The climate control device can be secured within the cushion cavity via one or more suitable fasteners (i.e., adhesives, screws, hook and loop fasteners, etc.). The climate control device can be press-fit into the cushion cavity so that hangers, fasteners, or both are not required. Preferably, the climate control device is oriented in the cushion cavity such that an impeller section of an air mover is in communication with the cushion channel, the support structure aperture, and/or the environment surrounding the B-side of the support device. Preferably, the dim control device is oriented in the cushion cavity such that an impeller section of an air mover is substantially free from any obstructions in the support device with the environment surrounding the B-side of the support device.

The support device may include one or more pads. The one or more pads may be one or more comfort layers disposed on the cushion, the climate control device, or both. The one or more pads may be air permeable, air impermeable, or a combination thereof. The one or more pads may include one or more holes or perforations so that a fluid can be moved through the pad (i.e., from the A-side to the B-side, or vice versa). The one or more holes or perforations may be generally aligned with one or more upper sheet apertures of the distribution insert. The one or more pads may be located between the distribution insert and a trim cover, an occupant in the support device, or a combination thereof. The one or more pads can be made of any suitable material. For example, the one or more pads may be made from reticulated foam. The one or more pads can be secured directly to the climate control device, the distribution insert, an upper sheet of the distribution insert, the cushion, as trim cover, or a combination thereof. The one or more pads can be secured to one or more of the aforementioned components in any suitable manor. For example, the one or more pads can be secured thereto using various mechanical fasteners like staples, pins, screws, sewing, hook-and-loop fasteners, and the like, various adhesives; and/or can be welded thereto using RF or IR welding.

The support device may include a trim cover. The trim cover may provide the support device, the cushion, or both with a comfortable feel, a decorative appearance, or both. The trim cover can be made of any suitable material. For example, the trim cover may be fabricated from leather, cloth, vinyl, fleece, cotton, a woven or knit material, etc. The trim cover may be any color and/or may include any pattern or texture. The trim cover may be air permeable or impermeable. The trim cover may be air impermeable, but may include one or more trim cover holes or perforations. The one or more trim cover holes or perforations may be generally aligned with the one or more holes or perforations in the one or more pads, the one or more upper sheet apertures in the distribution insert, or a combination thereof. The one or more trim cover holes or perforations may provide for fluid or air movement towards and/or away from an occupant in the support device (i.e., from the A-side to the B-side, or vice versa).

The support device may include one or more climate control devices. The one or more climate control devices may function to improve comfort of an occupant in or near the support device. The one or more climate control devices may move any suitable fluid, preferably in towards and/or away from an occupant in or near the support device. The one or more climate control devices may move an from the A-side to the B-side, from the B-side to the A-side, or both. The air moved towards and/or away form an occupant may be warm air, cool air, ambient air or a combination thereof. That is, the air may be moved past a suitable heating appliance to heat the air while flowing towards the occupant or moved past a suitable cooling appliance to cool the air while flowing towards the occupant. The one or more climate control devices may include one or more air movers and one or more distribution inserts.

The one or more air movers may be any device or combination of devices may move fluid, a flow of fluid, or both. More specifically, the one or more air movers may be any device(s) that may direct, pass, provide, move, blow, suck, push, exhaust, and and/or pull air. The one or more air movers may move air towards or away from an occupant in or near the support device. The air passed towards or away form the occupant may be ambient air, cooled air, warm air, or a combination thereof. The one or more air movers may be one or more fans or blowers. The one or more air movers may be one or more axial fans, centrifugal fans, cross-flow fans, or a combination thereof. Preferably, the one or more air movers include one or more radial fans. The one or more air movers may include one or more reversible fans operating in a pressurizing or suction mode. The one or more air movers may have multi-speed capabilities. That is, the one or more air movers may have at least a low, medium, and high setting.

The one or more air movers may include one or more diverters. The one or more diverters may function to distribute air blown out of the air mover while the climate control device is operating in a push mode, or may pull in air when the climate control device is operating in a pull mode. That is, in a push mode, the one or more diverters may function to distribute air to two or more areas or locations on the support device. When operating in a pull mode, the one or more diverters may function to draw-in air from multiple locations on the support device. Preferably, the one or more diverters may function to more evenly distribute air blown out from the air mover, and more evenly pull air into the air mover. The one or more diverters may include one or more diverter openings that are generally aligned with the one or more lower sheet apertures in distribution insert. The one or more air movers may have any suitable number of diverter openings. For example, the one or more air movers may have one more diverter openings. The one or more air movers may have six or fewer diverter openings, four or fewer diverter openings, three or fewer diverter openings, or preferably two or fewer diverter openings. Preferably, the one or more air movers have two diverter openings. The one or more diverter openings, or both may be generally spaced apart in any suitable angular orientation or spacing. Preferably, the one or more diverters, diverter openings, or both are evenly spaced apart from one another. That is, the one or more diverters, diverter openings, or both may generally oppose each other. The one or more air movers may also have a center opening that is generally aligned with a rotational axis of the impeller, and/or in fluid communication with one of the lower sheet apertures. The diverters, the diverter openings or both may be attached to the distribution insert in any suitable manner. For example, diverters, the diverter openings or both can be secured to the distribution insert using, various mechanical fasteners like staples, pins, screws, sewing, hook-and-loop fasteners, and the like and/or various adhesives. Preferably, the diverters, the diverter openings or both are secured to a lower sheet of the distribution insert using RF or IR welding to create a seal. Preferably, the seal is air impermeable so that fluid leakage therebetween is reduced or prevented. The seal can be between or around the diverters, the diverter openings or both, and the lower sheet, around the diverters, the diverter openings or both, and the lower sheet, or both. The seals between and/or around the diverters, the diverter openings or both and the lower sheet may be one, single connected seal, or the seals may be independent such that the seals corresponding to teach diverter opening do not touch one another.

The one or more air movers may include a flange. The flange can be any section of the one or more air movers or the housing that attaches the air mover to the one or more distribution inserts, the lower sheet, or both. The flange may have any suitable shape. Preferably, the flange has a generally planar, ring, shaped section. The flange may be attached to the distribution insert in any suitable manner. Preferably, the attachments mechanisms include those that do not transmit or amplify vibration or noise from the air mover to the support device. Preferably, the flange, the air mover, or both is secured to a lower sheet of the distribution insert using RF or IR welding to create a seal. Preferably, the seal is air impermeable so that fluid leakage therebetween is reduced or prevented. The seal can be between the flange and the lower sheet, around the flange and the lower sheet, or both.

The one or more distribution inserts may function to distribute air moved by the air mover. The one or more distribution inserts may function to receive an pulled in by the air mover twin an area, region, or environment surrounding the support surface, the A-side, the B-side, or a combination thereof. The one or more distribution inserts may function to distribute an from the air mover towards an area, region or environment surrounding the support surface, the A-side, the B-side, or a combination thereof. The one or more distribution inserts may include one or more upper sheets, one or more lower sheets, and one or more spacer layers there between. The one or more upper sheets may be located at or near the A-side and the one or more lower sheets may be located at or near the B-side, or vice versa. The one or more upper and lower sheets may substantially enclose or surround the one or more spacer layers. The one or more upper and lower sheets may be substantially air impermeable. The one or more upper and lower sheets may be sealed at their edges. The sheets may be sealed at their edges to form an air impermeable bag structure. The sheets may be sealed via any suitable method or fastener. Preferably, the sheets are sealed at their periphery via IR, RF or ultrasonic welding methods.

The one or more upper sheets may include one or more upper sheet apertures, and the one or more lower sheets may include one or more lower sheet apertures. When the climate control device is operating in a push mode, the one or more upper sheet apertures may provide for the air from the air mover to be directed towards the support surface, the A-side, an occupant in the support device, or a combination thereof. When the climate control device is operating in a pull mode, the one or more upper sheet apertures may provide for the air to be pulled from the support silence, the A-side, an occupant in the support device, or a combination. The one or more lower sheet apertures may be in fluid communication with the one or more air movers. Preferably, the one or more lower sheet apertures are substantially aligned with the one or more diverter openings, center opening, or a combination thereof in the air mover. The one or more upper sheet apertures, lower sheet aperture, or both may be any suitable size. Preferably, the one or more upper sheet apertures, lower sheet aperture, or both may vary in size. That is, the size of the one or more upper sheet apertures may increase as the distance from the air mover increases so that the air flow is more uniform from the air mover. The size of the one or more apertures may be uniform. The one or more apertures may be arranged in any pattern. For example, the one or more apertures in the upper sheet may be arranged in a linear arrangement, a U-shape arrangement (i.e., under the legs of an occupant in the seating portion).

The one or more spacer layers may function to prevent crushing of the distribution insert under the weight of art occupant in the support device or when a load is applied thereto. The one or more spacer layers may provide cushion and support to the occupant, a load, or both. The one or more spacer layers may be form fitting and/or may at least partially deflect or compress when an occupant is in the support device. The one or more spacer layers may prevent crushing of the one or more air movers when an occupant or load is in or near the support device. The one or more spacer layers may prevent deflection of the support device, a cushion or portion of the support device, or a combination thereof so that a flow of air between the support device and the air mover is neither restricted nor blocked. The one or more spacer layers may function to more evenly distribute air through the distribution insert by created channels therein. The one or more spacer layers may provide for the air to move laterally there along when the system is operating in a push mode, a pull mode, or both. The one or more spacer layers may be any suitable material or combination of materials. The one or more spacer layers may be a fibrous layer. The one or more spacer layers may include a base or a carrier having one or more spacers. The one or more spacer layers may be made from a material sold under the trade name 3MESH® and is commercially available from Mueller Textil GmbH, Germany or Mueller Textiles, Inc., Rhode Island. The one or more spacers may be similar to the spacers disclosed in commonly-owned U.S. Pat. No. 8,777, 320 B2, which is hereby incorporated by reference in its entirety for all purposes.

The one or more climate control devices can operate in a push mode. In a push mode, the one or more air movers may draw in air from the environment, area or region surrounding the B-side of the support device, through the impeller section, through the passageway, and then push the air through the one or more diverters and corresponding diverter openings. The air may then be pushed into the distribution insert via the one or more lower sheet apertures, and out of the distribution insert via the one or more upper sheet apertures towards an occupant in or near the A-side of the support device. Along the way, the air may be heated or cooled by passing the air past and/or through one or more heating appliances or cooling appliances, respectively.

The one or more climate control devices can operate in a pull mode. In a pull mode, the one or more air movers may draw in air from the environment, area or region surrounding the A-side of the support device. The air may be pulled by the one or more air movers through the trim over and the pad, through the one or more apertures in the upper sheet and into the distribution insert. The air may then be pulled from within the distribution insert via the one or more holes in the lower sheet and through passageway. The air may then be exhausted or blown out to the environment surrounding the B-side of the support device.

Figure 1B:
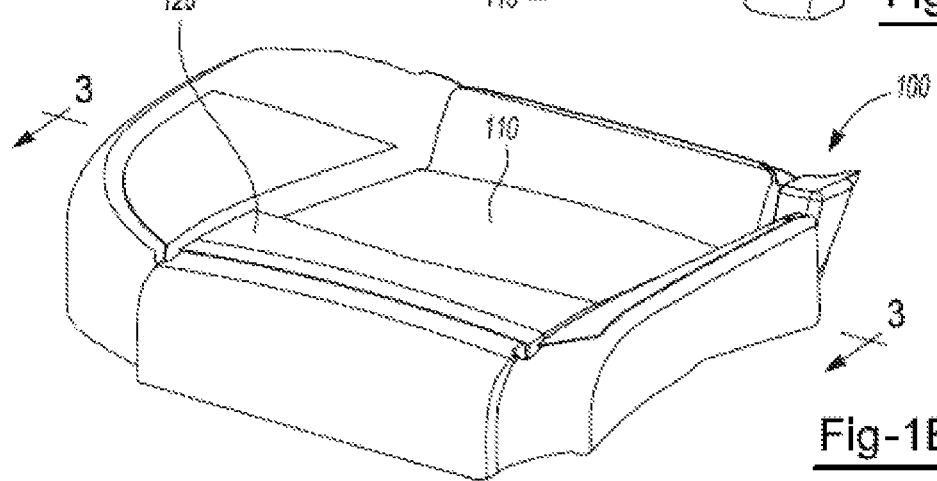
FIG. 1B is a perspective view of a support device.

FIGS. 1A and 1B each illustrate the support device 100. In FIG. 1A, the support device 100 is the backrest portion of a vehicle seat, and in FIG. 1B, the support device 100 is the seating portion of a vehicle seat. The support device 100 includes a trim cover 110 and a support surface 120 that contacts and/or supports an occupant in the support device 100.

Figure 2:
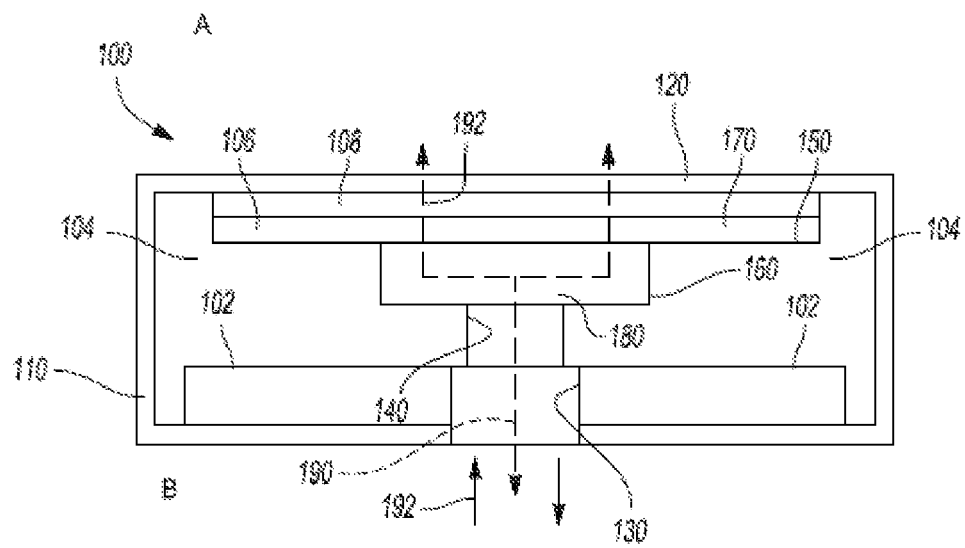
FIG. 2, is a schematic cross-sectional view of the support device of FIG. 1A and/or of FIG. 1B taken along line 2-2 and/or line 3-3, respectively.

FIG. 2 is a schematic cross-sectional view of the support device of FIG. 1A and/or of FIG. 1B taken along line 2-2 and/or line 3-3, respectively. The support device 100 includes an A-side "A" and a B-side "B". The support device 100 includes a support surface 120 that contacts and/or supports an occupant. The support device 100 includes a support structure 102. The support structure 102 supports a cushion 104, a climate control device 106, a pad 108, and the trim cover 110. The support structure 102 includes a support structure aperture 130. The support structure aperture 130 is in communication with a cushion channel 140 and a cushion cavity 150, both of which are located in the cushion 104. The support structure aperture 130, the cushion channel 140 and the cushion cavity 150 provide a passageway 180 that generally extends between the A-side A and the B-side B.

The climate control device 106 is supported in the cushion cavity 150. The climate control device 106 includes an air mover 160 and a distribution insert 170. The climate control device 106 operates in a push mode and in a pull mode. In the push mode, the air mover 160 moves air in the direction of arrows 192 from the B-side B of the support device 100 to the A-side A of the support device 100. More specifically, in the push mode, the air mover 160 draws air into the passageway 180 from the environment surrounding the B-side B, and then pushes the air through the distribution insert 170 and out to an occupant in or near the support surface 120. In the push mode, the air may also be passed over a heating appliance or a cooling appliance to provide warm air or cool air, respectively, towards the occupant. In the pull mode, the air mover 160 moves air in the direction of arrows 190 from the A-side A of the support device 100 to the B-side B of the support device 100. More specifically, in the pull mode, the air mover 160 draws air into the distribution insert 170 and the passageway 180 from the environment surrounding the A-side, and then pushes the air out to the environment surrounding the B-side B of the support device 100.

Figure 3:
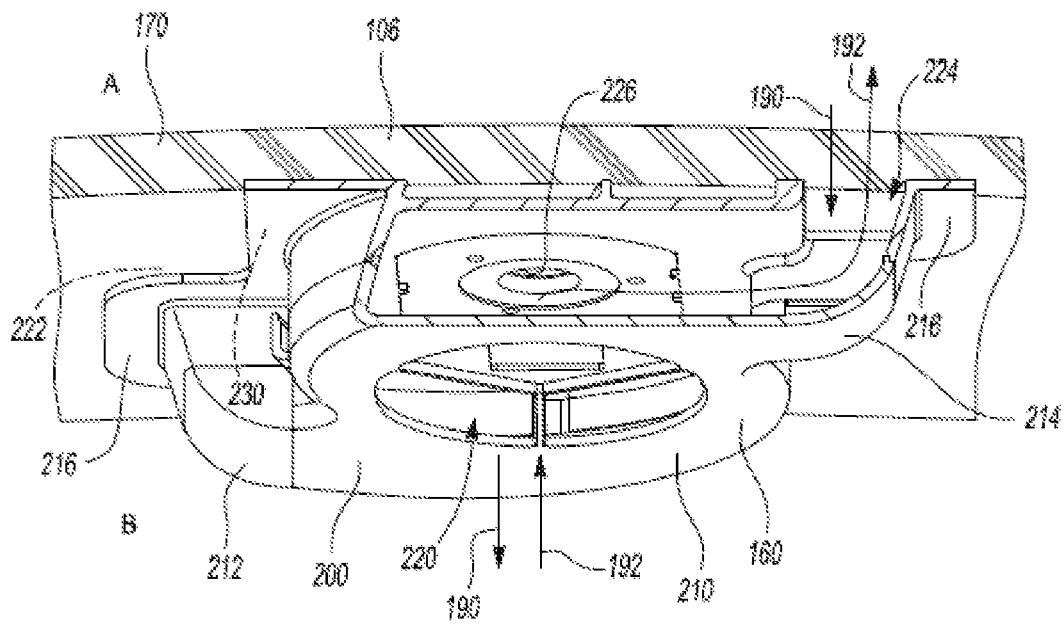
FIG. 3 is a partial perspective view of a climate control device attached to a support device.
Figure 4:
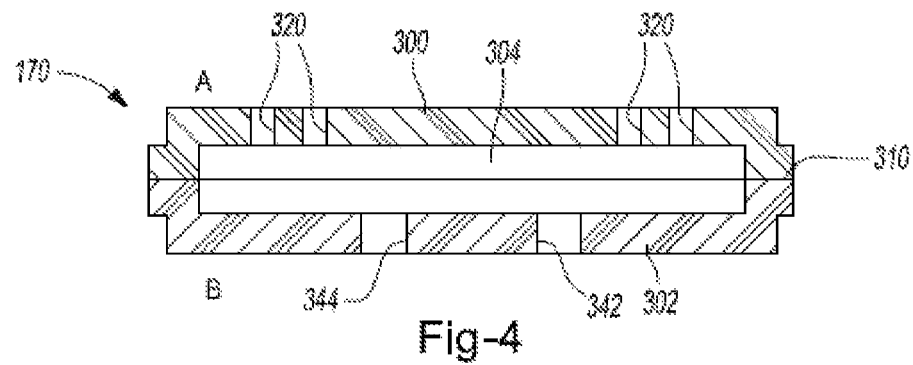
FIG. 4 is a schematic cross-sectional view of a distribution insert.
Figure 5:
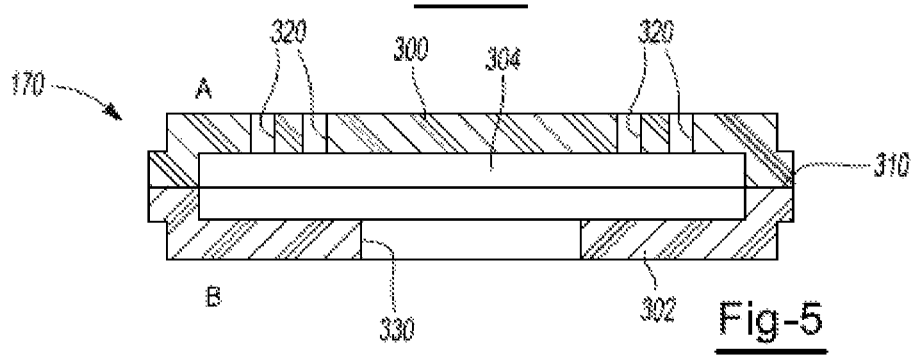
FIG. 5 is a schematic cross-sectional view of a distribution insert.
Figure 6:
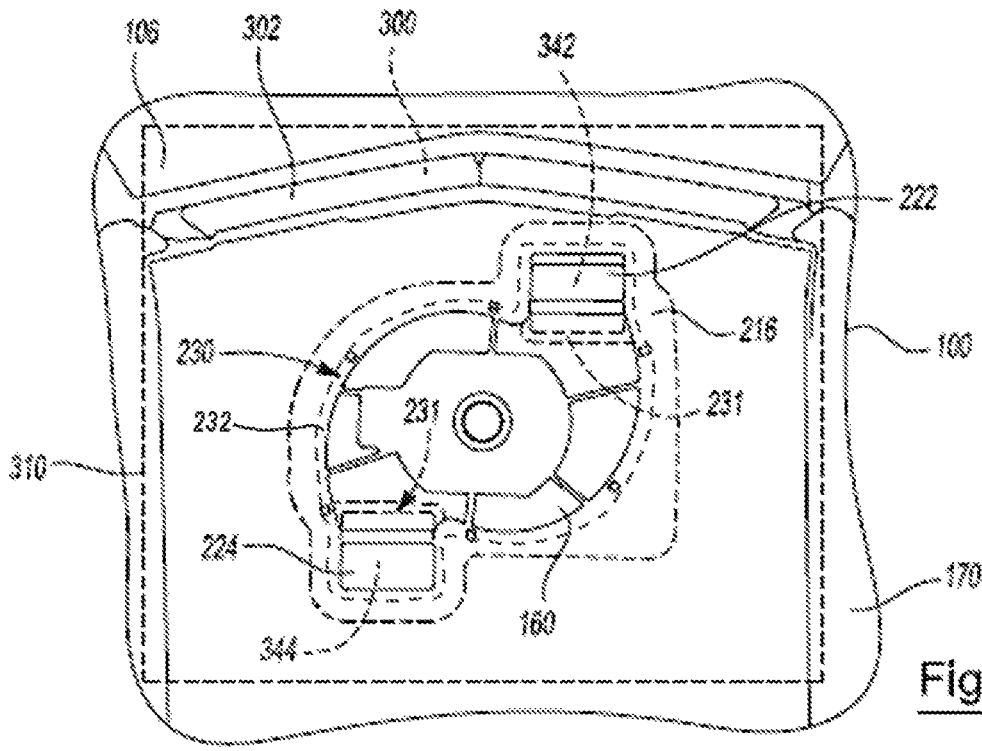
FIG. 6 is a bottom view of a climate control device attached to a support device.

FIG. 3 further illustrates the climate control device 106. The air mover 160 includes a housing 200 having an impeller section 210 housing a rotating impeller (not shown); a pair of diverters 212, 214; and a flange 216. The impeller section 210 includes an opening 220 through which the air mover 160 draws in an along arrows 192 when the climate control device 106 is operating in a push mode, and exhausts or forces an out along arrows 190 when the climate control device 106 is operating in a pull mode. The air mover 160 includes a center opening 226 that may be in fluid communication with a low sheet aperture 330 (FIG. 5). The diverters 212, 214 include respective diverter outlets 222, 224. The diverter outlets 222, 224 are in fluid communication with one or more corresponding lower sheet apertures 342, 344 (FIGS. 4-6). A seal 230 is formed between and/or around the flange 216 and the distribution insert 170 to securely connect the air mover 160 to the distribution insert 170. One or more other seals 231 (FIG. 6) can be formed between and/or around the diverters 212, 214 and the distribution insert 170 to provide seal the respective diverter openings 222, 224 and the lower sheet apertures 342, 344.

FIG. 4 is a schematic cross-sectional view of a distribution insert 170. The distribution insert 170 includes an upper sheet 300, a lower sheet 302, and a spacer layer 304 therebetween. The upper and lower sheets 300, 302 include a seal 310 forming a bag structure. The upper sheet 300 faces the A-side A and includes a plurality of upper sheet apertures 320. The lower sheet 302 faces the B-side B and includes a plurality of lower sheet apertures 342, 344. The lower sheet apertures 342, 344 may be in fluid communication with the diverter openings 222, 224 of the air mover 160.

FIG. 5 is a schematic cross-sectional view of a distribution insert 170. The distribution insert 170 includes an upper sheet 300, a lower sheet 302, and a sparer layer 304 therebetween. The upper and lower sheets 300, 302 include a seal 310 forming a bag structure. The upper sheet 300 faces the A-side A and includes a plurality of upper sheet apertures 320. The lower sheet 302 faces the B-side B and includes a lower sheet aperture 330. The lower sheet aperture 330 may be in fluid communication with the center opening 226 of the air mover 160.

FIG. 6 is a bottom view of a climate control device 106 attached to a support device 100. The distribution insert 170 includes upper and lower sheets 300, 302 connected along their periphery by a seal 310. A seal 230 may be formed between and/or around the flange 216 of the air mover 160 and the lower sheet 302 for connecting the air mover 160 to the distribution insert 170. The lower sheet 302 includes lower sheet apertures 342, 344 corresponding to the diverter openings 222. Alternatively, or in addition to the seal 230, one or as seals 231 may be formed between and/or around the corresponding lower sheet apertures 342, 344 and diverter openings 222, 224. Alternatively, or in addition to the one or more lower sheet apertures 342, 344, the lower sheet 302 may include one or more apertures 232. The one or more apertures 232 may be located at various locations, and may be the same size, slightly larger, or slightly smaller than the air mover 160, the flange 216 of the air mover 160, or both. Preferably, the aperture 232 is smaller than an outer edge of the flange 216 and fits within a footprint of the seal 230. Preferably, the aperture 232 is at least larger than the center opening 226, and/or one or more of the lower sheet apertures 342, 344. In some configurations, the aperture 232 can include the lower sheet aperture 330, and one or more of the lower sheet apertures 342, 344. The lower sheet aperture 330 and one or more of the lower sheet apertures 342, 344 may be interconnected or separate. The aperture 232 can correspond to or have a shape that is generally similar to the air mover, 160, the flange 216, the seal 230 or a combination thereof.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Teachings of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such sublet matter to be part of the disclosed inventive subject matter.

I claim:

1. A climate control device, comprising:
   i. a distribution insert; and
   ii. an air mover attached to the distribution insert,
   wherein the air mover includes two or more diverter openings moving a fluid through the distribution insert,
   wherein the air mover moves the fluid through a support device, and
   wherein the air mover includes a flange that is RF welded directly to the distribution insert.

2. The climate control device of claim 1, wherein the distribution insert includes an upper sheet and an opposing lower sheet including two or more lower sheet apertures,
   wherein the flange is RF welded directly to the lower sheet thereby forming a seal therebetween so that the two or more diverter openings are in fluid communication with the two or more corresponding lower sheet apertures.

3. The climate control device of claim 2, wherein another seal is formed by RF welding the flange and the lower sheet around each of the two or more diverter openings and the corresponding two or more lower sheet apertures.

4. The climate control device of claim 2, wherein the lower sheet includes two lower sheet apertures and the air mover includes two diverter openings.

5. The climate control device of claim 2, wherein second seals are formed by RF welding the flange and the lower sheet between each of the diverter openings and the corresponding lower sheet apertures.

6. The climate control device of claim 5, wherein the second seals located between the corresponding diverter openings and the lower sheet apertures do not touch each other.

7. The climate control device of claim 1, wherein the distribution insert includes an upper sheet having at least one upper sheet aperture and a lower sheet having two or more lower sheet apertures,
   wherein the upper sheet and the lower sheet are sealed at their peripheries,
   wherein the at least one upper sheet aperture is in fluid communication with a support region of a support device, and each of the two or more lower sheet apertures are in fluid communication with each of the corresponding two or more diverter openings,
   wherein the flange is RF welded directly to the lower sheet, and
   wherein the air mover moves air towards an occupant in the support device and/or away from the occupant in the support device.

8. A support device, comprising:
   i. a seat having a support surface; and
   iii. a climate control device connected to a portion of the seat, the climate control device including a distribution insert and an air mover,
   wherein the air mover includes two or more diverter openings moving a fluid through the distribution insert, and
   wherein the air mover is RF welded to the distribution insert so that a seal is formed around each of the two or more diverter openings.

9. The support device of claim 8, wherein the air mover includes a flange that is RF welded directly to the distribution insert forming another seal between the air mover and the distribution insert.

10. The support device of claim 8, wherein the seat comprises:
    i. a seating portion; and/or
    ii. a backrest portion,
    wherein a cavity is formed in the seating portion and/or in the backrest portion and is configured to receive the climate control device.

11. The support device of claim 8, wherein the distribution insert comprises an upper sheet and a lower sheet connected together at their peripheries,
    wherein the upper sheet includes one or more upper sheet apertures that are in fluid communication with the support surface, and the lower sheet includes two or more lower sheet apertures that are in fluid communication with the corresponding two or more diverter openings.

12. The support device of claim 8, wherein the air mover includes two distribution openings that are on opposing sides of the air mover.

13. The support device of claim 8, wherein the seat comprises:
    i. a support structure having a support structure aperture; and
    ii. a cushion supported on the support structure and having a cushion channel and a cushion cavity that are in fluid communication with the support structure aperture thereby defining a passageway between an A-side and a B-side of the support device.

14. The support device of claim 8, wherein the air mover is a radial fan.

15. A climate control device, comprising:
i. a distribution insert attached to a support device; and
ii. an air mover having two or more openings moving a fluid through the distribution insert and the support device,
wherein the air mover includes a flange that is RF welded directly to the distribution insert forming a first seal therebetween.

16. The climate control device of claim 15, wherein the distribution insert includes two or more lower sheet apertures that are in fluid communication with the corresponding two or more openings in the air mover,
wherein the two or more openings are on opposite sides of the air mover.

17. The climate control device of claim 16, wherein the air mover includes a center opening in fluid communication with another lower sheet aperture.

18. The climate control device of claim 15, wherein second seals are formed by RF welding the openings of the air mover to the corresponding lower sheet apertures.

19. The climate control device of claim 18, wherein two second seals are formed and the two seals do not touch each other.

20. A climate control device, comprising:
i. a distribution insert, the distribution insert includes an upper sheet and an opposing lower sheet including two or more lower sheet apertures; and
ii. an air mover,
wherein the air mover includes two or more diverter openings moving a fluid through the distribution insert,
wherein the air mover includes a flange that is RF welded directly to the lower sheet thereby forming a seal therebetween so that the two or more diverter openings are in fluid communication with the two or more corresponding lower sheet apertures, and
wherein the air mover moves the fluid through a support device.

21. The climate control device of claim 20, wherein another seal is formed by RF welding the flange and the lower sheet around each of the two or more diverter openings and the corresponding two or more lower sheet apertures.

22. The climate control device of claim 20, wherein the lower sheet includes two lower sheet apertures and the air mover includes two diverter openings.

23. The climate control device of claim 20, wherein second seals are formed by RF welding the flange and the lower sheet between each of the diverter openings and the corresponding lower sheet apertures.

24. The climate control device of claim 23, wherein the second seals located between the corresponding diverter openings and the lower sheet apertures do not touch each other.

* * * * *